Sept. 12, 1944.  O. C. FREDERICK  2,358,155
WELDING APPARATUS
Filed July 26, 1940  2 Sheets-Sheet 1
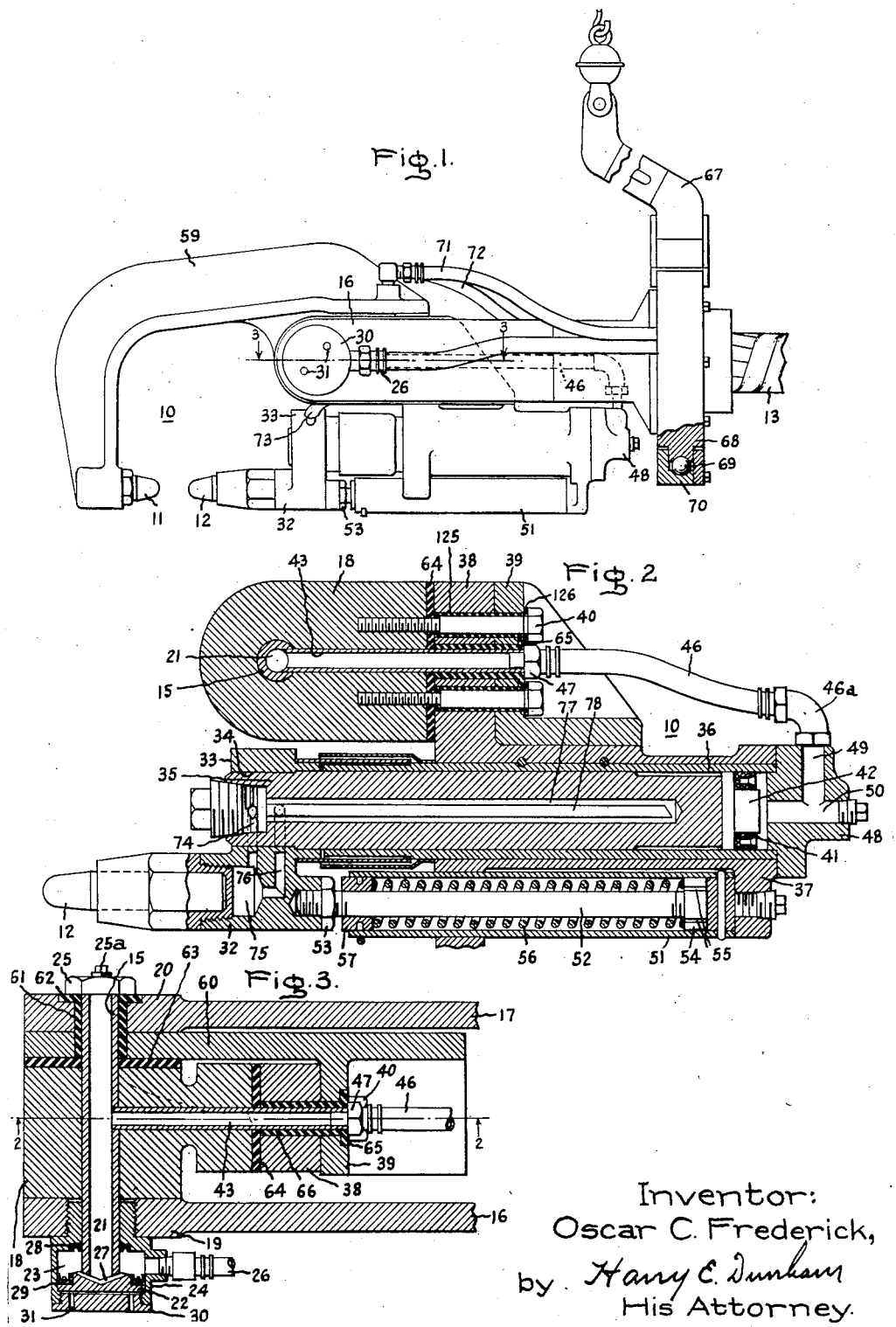
Inventor:
Oscar C. Frederick,
by Harry C. Dunham
His Attorney.

Sept. 12, 1944.  O. C. FREDERICK  2,358,155
WELDING APPARATUS
Filed July 26, 1940  2 Sheets-Sheet 2
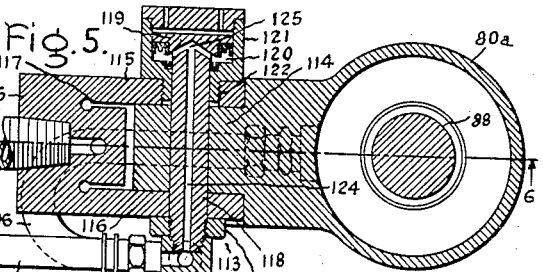
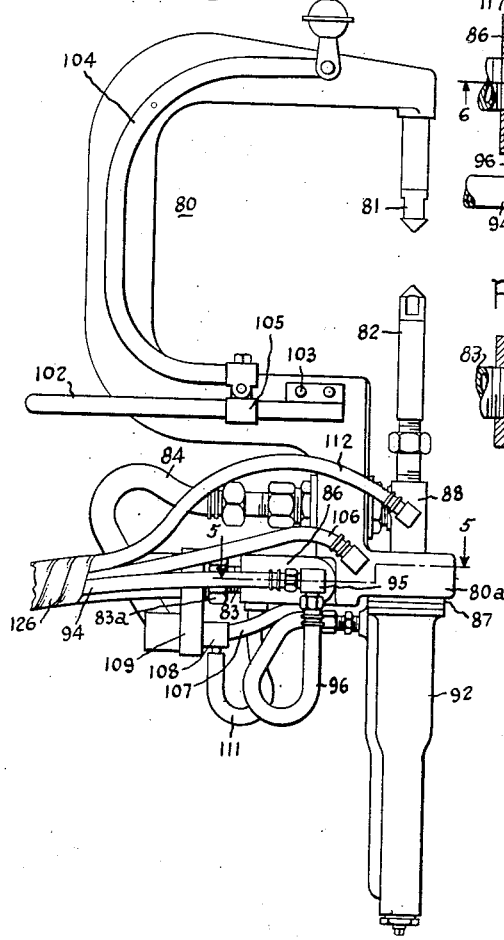
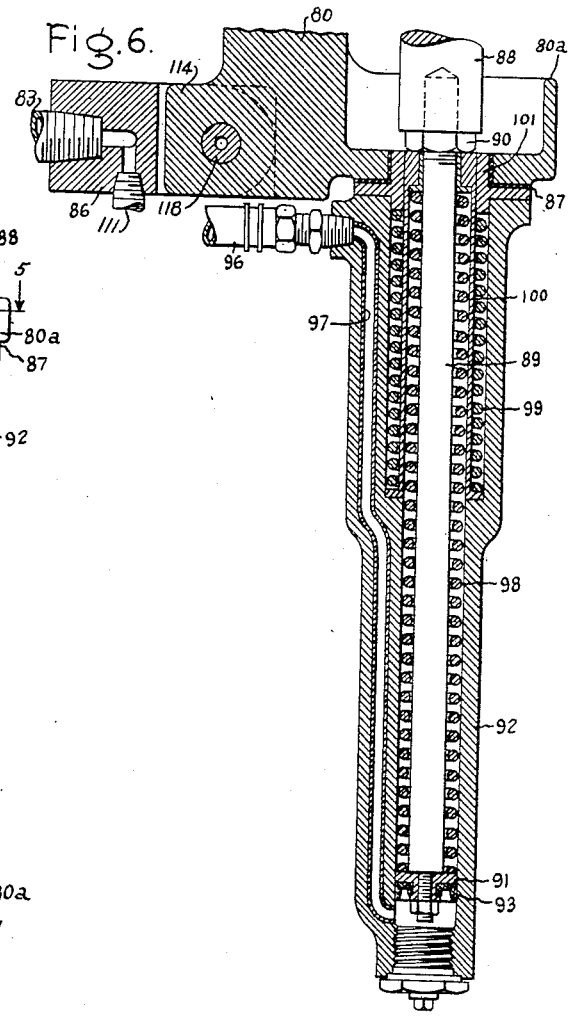
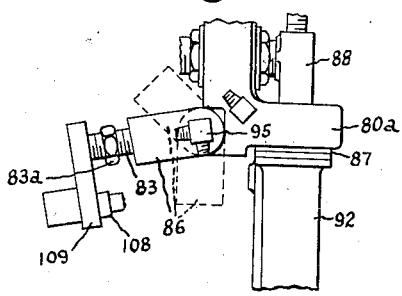
Inventor:
Oscar C. Frederick,
by Harry E. Dunham
His Attorney.

Patented Sept. 12, 1944

2,358,155

UNITED STATES PATENT OFFICE 2,358,155

WELDING APPARATUS

Oscar C. Frederick, Springfield, Pa., assignor to General Electric Company, a corporation of New York Application July 26, 1940, Serial No. 347,809

17 Claims. (Cl. 219—4)

My invention relates to welding apparatus and more especially to portable resistance welders of the type known as welding guns.

Portable welding means, especially arranged for spot welding members together as parts of automobile bodies and fabricated sheet metal structures, for example, have been constructed and used. Inasmuch as large currents are required to weld even light articles, relatively large and heavy current-carrying cables are required for conducting the welding current to the electrodes. If cables sufficiently small and flexible to permit free manipulation are provided, electric energy losses are excessive. If large cables are employed, the apparatus is rendered relatively inflexible so that it is difficult to manipulate and adjust the gun and the desired portability is lost. A compromise often resorted to hitherto is unsatisfactory because movements of the welding gun cause movement and, consequently, wear of the cables or current conductors. Further, with such an arrangement, the cables are still relatively bulky so that the gun is hard to place and hold in the desired position and therefore rapid fatigue of the operator is caused and variations in the quality of work result.

Therefore, it is an object of my invention to provide new and improved welding apparatus of the above type which is readily adjustable and easily applied to the work and arranged so that minimum cable wear and operator fatigue result.

Further objects and advantages of my invention will become apparent as the following description proceeds and the features of novelty which characterize my invention will be pointed out with particularity in the claims annexed to and forming a part of this specification.

For a better understanding of my invention reference may be had to the accompanying drawings in which Fig. 1 is a side view of a welding gun embodying the principles of my invention; Fig. 2 is an enlarged cross sectional view of a portion of the gun shown in Fig. 1 taken along the line 2—2 of Fig. 3; Fig. 3 is an enlarged sectional view of the gun shown in Fig. 1 taken along the line 3—3 of Fig. 1; Fig. 4 is a side view illustrating a different embodiment of my invention; Fig. 5 is an enlarged sectional view of the gun shown in Fig. 4 taken along the line 5—5 of Fig. 4; Fig. 6 is an enlarged sectional view taken along the line 6—6 of Fig. 5; and Fig. 7 is a partial view illustrating various positions to which the gun shown in Fig. 4 may be adjusted.

Referring to Fig. 1 of the drawings, I have provided a welding gun including a generally C-shaped frame 10 pivotally associated with and supported from a cable 13. I have provided means for selectively permitting or preventing relative pivotal movement between the frame 10 and the cable 13 so that it is unnecessary for the operator, when it is desired to adjust the gun 10 to the work, also to move the cable 13.

In the form of my invention shown in Figs. 1 to 3, inclusive, of the drawings the frame 10 is pivotally mounted with respect to the cable 13 by means of a pivot member or support 15. In order to hold securely the frame 10 in the desired position for welding, I have provided a clamp to prevent such relative pivotal movement between the frame and the cable 13 during the welding operation. In the form of my invention shown in the drawings, the clamp is hydraulically operated, as explained hereinafter.

Welding current is supplied to the electrodes 11 and 12 over an electric circuit completed by current carrying conductors included in the cable 13, the conductors terminating in terminals 16 and 17. In order pivotally to support the frame from the terminals, which may for convenience be termed a mounting means, I have provided a pivot or swivel member 15 passing through suitable openings in the supporting portion 18 of the frame 10 and the end portions 19 and 20, respectively, of the terminals 16 and 17. The pivotal support 15 is arranged and constructed to permit selective clamping or unclamping of the frame with respect to the terminals and therefore the conductors. In the illustrated forms of my invention I have provided a hydraulically operated arrangement for carrying out the clamping function. As best shown in Fig. 3, the pivotal support 15 is hollow thereby providing a fluid passage 21 extending axially thereof and which is closed at one end by a suitable plug 25a. At one end of the member 15 there is provided a piston 22 reciprocably disposed within a pressure chamber 23 formed within a casing 24. The casing is suitably secured to the terminal 16 as by means of a suitably threaded boss engaging a correspondingly threaded tap in the end portion 19 of the terminal 16. To the other end of the hollow pivotal member 15 there has been applied suitable securing means, such as a nut 25 of substantial area. Operating fluid for actuating the piston is admitted to the chamber 23 through a conduit 26. In order to provide communication between the passage 21 and the chamber 23, a plurality of apertures 27 are provided adjacent the piston 22. It will be seen that as the pressure builds up in the passage 21 and chamber 23, the piston 22 will tend to move downwardly as viewed in Fig. 3, thereby tending to draw the member 15 and nut 25 in the same direction. At the same time, the casing 24 will tend to be forced upwardly as viewed in Fig. 3, thereby exerting an upward pressure or tightening engagement against the portion 18 of the frame 10. The two oppositely directed forces thereby cause clamping of the terminals 16 and 17 to the frame 10. Thus, member 15 not only provides a support for the frame but also serves as a part of the clamping means. In order to prevent the escape of fluid along the swivel member 15 and around the piston 22, I have provided suitable sealing means, such as cup leathers 28 and 29, respectively. In order to prevent the formation of a vacuum between the piston 22 and the end cap 30 of the casing 24, I have provided a plurality of pressure equalizing passages 31 communicating between atmosphere and the space between the piston 22 and the cap 30. Upon the release of the hydraulic pressure the frame will be loosened or unclamped with respect to the terminals 16 and 17 thereby permitting the frame 10 to be moved pivotally about the hollow member 15 to another position.

I prefer to make one of the electrodes, as electrode 12, movable with respect to the other electrode. Therefore, I have provided means for reciprocating the movable or reciprocable electrode 12 with respect to the fixed electrode 11. As best shown in Fig. 2, electrode 12 is suitably carried by a block 32 having a laterally extending bracket 33, the bracket being suitably apertured, as indicated by the numeral 34, to receive one end of a piston 35. The bracket 33 is secured in any suitable way to the piston 35. The piston is reciprocably arranged within a cylinder 36, the cylinder being defined by a sleeve suitably secured in a suitable bore in the cylinder block 37. The cylinder block is supported from the portion 18 of the frame 10 by means of a bracket 38 interposed between the flange 39 of the member 60 and the portion 18 of the frame and suitably fastened by means of fastening means, such as bolts 40, passing through suitably formed openings in the brackets 38 and 39 into engagement with threaded bores in the portion 18. The inner end of the piston 35 is provided with suitable sealing means as cup leathers 41 supported by a stud or end portion 42 of reduced diameter suitably secured or integral with the piston 35. It will be seen that if the piston is moved to the left, as viewed in Fig. 2, the electrode 12 will be moved in the same direction because of the fixed relationship between the piston 35 and the electrode carrying block 32. I have provided hydraulic means for thus operating the movable electrode. There is provided a hollow tube or sleeve 43 extending laterally through suitable apertures in the portion 18 and brackets 38 and 39, the tube 43 communicating at one end thereof with the passage 21 in the member 15 and at the other end thereof with a conduit 46 suitably connected thereto as by means of a connecting device 47. The cylinder head 48 is provided with communicating passages 49 and 50, the latter communicating with the cylinder bore at the end of the piston 35. The conduit 46 is connected with the passage 49 by means of a suitable connecting device 46a. Thus, to move the reciprocable electrode 12 toward the electrode 11 and into engagement with the work to be welded, the hydraulic fluid is conducted to the cylinder bore along a path including the conduit 26, passage 21 in the hollow member 15, tube 43, conduit 46 and passages 49 and 50.

I have provided means for returning the movable electrode 12 and piston 35 to the inoperative positions thereof when the hydraulic pressure is released. For this purpose, I have provided an auxiliary cylinder 51 adjacent the pressure cylinder 36 and containing a reciprocable rod 52 suitably secured at one end thereof to the block 32 as by threaded engagement with a suitable aperture therein and a lock nut 53. The other end of the rod 52 is provided with a piston-like member or collar 54 which fits snugly within the cylinder 51 to insure smooth reciprocation but which has a plurality of pressure equalizing passages 55 therethrough to maintain equal pressures on both sides of the member 54. In order to bias the rod and hence the electrode 12 toward the right, as viewed in Fig. 2, I have provided a spring 56 in the cylinder 51 disposed between the collar 54 and the end plug 57 of the cylinder. Thus, when the pressure tending to move the electrode to the left is greater than the force of the spring 56 tending to cause the electrode to be moved to the right, the electrode will be advanced or moved to the work engaging position, whereas when the fluid pressure is less than the spring pressure, the electrode will be moved to the right.

As previously mentioned, there is provided an electric circuit for conducting welding current to the electrodes. As best shown in Fig. 3, a face of the end portion 19 of terminal 16 engages a face of the portion 18 of the frame 10 which is preferably integral with the arm 59 of the frame at one end thereof. The other end of the arm 59 carries the fixed electrode 11 suitably secured thereto. The electric circuit between the terminal 17 and the movable electrode includes the end portion 20 of the terminal, the member 60, the bracket or flange 39, the bracket 38, the cylinder block 37, the cylinder 36, the bracket 33 and the block 32. In order to insulate the above-described current paths from each other, suitable insulation is provided. A sleeve 61 is disposed about the hollow member 15 where it passes through the member 60 and the end portion 20 of the terminal 17. An insulating washer 62 provides insulation between the nut 25 and the end portion 20 and an insulating washer 63 provides insulation between the member 60 and the portion 18. The portion 18 is insulated from the brackets 38 and 39 by means of insulating washers 64 and 65, and the insulating sleeve 66. The bolts 40 are insulated from the brackets 38 and 39 by means of suitable sleeves 125 and washers 126.

In order to support the gun and cable 13 I have provided a supporting device 67 which may be suspended from the ceiling or the boom of a crane or in any other suitable manner. In order to provide for easy manipulation of the gun and cable, I have supported the gun and cable at substantially the center of gravity of the apparatus including the cable.

I have also provided means by which the gun and its pivotal mounting as well as the cable 13 may be rotated about the axis of the mounting and cable, that is, about an axis substantially at right angles to the axis of the pivotal mounting. For this purpose, I have provided an inner circular ring or bearing 68 revolving upon ball bearings 69 within a circular carrier or outer ring 70. The outer ring 70 is suitably secured to the support 67 and the cable 13 and terminals 16 and 17 are suitably supported from the inner ring 68, the electrical conductors being suitably insulated therefrom.

In order to cool the fixed electrode, I have provided a pair of cooling fluid conveying conduits 71 and 72, respectively, the conduits having communication with the ends of a suitable cooling passage (not shown) extending through the arm 59 into the vicinity of the electrode 11. The conduits 71 and 72 are incorporated in the cable 13. In order to cool the movable electrode, I have provided a pair of cooling fluid conveying conduits one of which is indicated by the numeral 73, the conduits also being included within the cable 13. As best shown in Fig. 2, one of the last-mentioned cables communicates with the passage 74 in the block 32. The cooling fluid is then circulated through the hollowed out portion 75 and passage 76. In order to cool the piston 35, there is provided a passage 77, a tube 78 being disposed concentrically therein. The cooling fluid flows from passage 76 through the tube 78, and from the open end thereof the cooling medium flows back along the outside of the tube 78 within the passage 77. In order to permit pivotal movement of the frame 10 through a full 180°, the fluid conveying conduits are made of a flexible material such as rubber and sufficiently long to permit the desired pivotal movement.

Operation of the device is believed clear, but will be briefly reviewed. When it is desired to perform a welding operation the gun is manually placed in approximately the desired position, this operation being rendered easy by reason of the use of support 67. The flow of hydraulic fluid is then initiated to convey the fluid through the conduit 26. The fluid first enters the clamping device but inasmuch as the passage 21 is in direct communication with the electrode moving cylinder 36 of the fluid pressure device, the fluid flows through the clamping device without causing any clamping action. The pressure first builds up in the cylinder 36 moving the electrode 12 to the work engaging position. As the pressure builds up successively from the cylinder 36 back towards the source of fluid, the pressure finally will build up in the chamber 23 causing clamping of the terminals and the gun in the desired position. It will be understood that this successive building up of pressures will take place substantially simultaneously in cylinder 36 and chamber 23.

From the foregoing description, it will be seen that the clamping action for preventing pivotal movement between the gun and the cable also serves to provide minimum resistance at the connections of the terminals 16 and 17 to the adjacent parts of the welding gun and, therefore, maximum current transfer with a minimum of heating.

In Figs. 4 to 7, inclusive, there is illustrated a different embodiment of my invention. There is disclosed a welding gun comprising a frame 80 of generally C-shape having a fixed electrode 81 and a reciprocable electrode 82. Welding current is supplied over an electric circuit completed by means of current carrying conductors 83 and 84. The frame 80 is pivotally connected with one of the conductors, as 83 in the illustrated embodiment, by terminal means such as a pivotal or swivel member 86 attached to the conductor 83 as by a connecting device 83a. Thus, a circuit for the fixed electrode 81 is completed through the conductor 83, the terminal or mounting member 86 and the frame 80. The movable electrode 82 is connected to the current carrying conductor 84 in any suitable manner, the conductor passing through a suitably arranged opening in the lower portion of the frame 80. The movable electrode is insulated from the lower bracket 80a of the frame by means of a flanged collar of insulating material 87.

I have provided means such as a fluid operated or hydraulic motor device for reciprocating the movable or reciprocable electrode 82. The electrode 82 is secured to the upper end of a stud 88, the lower end thereof being secured to a piston rod 89 as by threaded engagement therewith and a locking nut 90. A piston 91 is supported on the lower end of the rod 89. In order to seal the space between the side walls of the piston 91 and the cylinder 92 there is provided suitable sealing means such as a cup leather 93.

In order to reciprocate the piston and hence the electrode in the upward direction, as viewed in Fig. 6, I have provided a suitable supply of hydraulic fluid which is conducted to the cylinder below the piston 91 through a conduit 94, a three way connection 95, a conduit 96, and a passage 97 in the walls of the cylinder 92. The conduits 94 and 96 are preferably made from a flexible material such as rubber in order to permit ready pivotal movement of the gun with respect to the mounting member 86 as well as the electric current conductors 83 and 84 and the fluid supply conduits. The piston 91 is spring-biased to its lower position, as viewed in Fig. 6, by means of two springs 98 and 99 disposed in series relationship between the piston 91 and an insert 101, a suitably formed sleeve 100 being interposed therebetween. Suitable means, not shown, is provided for controlling the flow of fluid to the motor device.

In order to support the gun and cable 126 I have provided a support in the form of a bail 102 attached to the frame as by bolts 103 and a substantially C-shaped arm 104 pivotally connected to a slidable element 105 carried by the bail 102. The arm 104 may be supported from the ceiling or the boom of a crane or in any other suitable manner.

In order to cool the frame and the fixed electrode as well as the conductor 83, I may provide suitable passages in the conductor and frame, not shown. In the arrangement shown in Figs. 4 to 7, inclusive, I prefer to conduct the cooling water to the frame by means of a flexible conduit 106. After circulating through the frame and in heat exchange relationship with the fixed electrode 81, the cooling fluid such as water is withdrawn from the frame through the conduit 107 from which it passes to a T-connection 108 supported from a bracket 109, the bracket in turn being supported from the cable 126. The exhaust water passes from the T-connection through a conduit 111 to the pivotal mounting member 86 and from thence through a fluid conducting passage in the conductor 83. In order to cool the movable electrode 82 I have provided a fluid conveying conduit 112 for conducting cooling fluid to a suitable passage in the stud 88 and the movable electrode 82. After circulating in heat exchange relationship with the movable electrode 82 and supporting stud 88, the water is withdrawn through a suitable passage in the current carrying conductor 84. The bracket 109 may be arranged to complete connections between the conductor 84 and a corresponding conductor in the cable 126 and between cooling fluid passages in conductor 84 and cable 126.

In order to permit selective clamping or loosening of the frame and conductor 83, I have provided mounting means between the frame and the conductor 83. For this purpose there is provided the pivotal member 86 and a fluid operated clamping means 113 associated therewith. As shown, the frame 80 is provided with a tongue 114 extending into the space between the arms 115 and 116 of the mounting member 86, the mounting member being slit, as indicated by the numeral 117, in order to provide additional flexibility. In order to provide a pivotal support for the frame with respect to the mounting member 86, I have provided a hollow supporting member or pivot means 118 extending through the arms 115 and 116 and the tongue 114. At one end of the member 118 there is provided a piston 119 which is reciprocably arranged in a pressure chamber 120 within the casing 121 supported or secured to the arm 115 as by means of an externally threaded projection 122. The other end of the hollow member 118 is secured to the mounting member 86 by means of a nut 123 having surface engagement with the arm 116. The operation of the clamping means is made dependent upon the operation of the motor device which imparts movement to the movable electrode by connecting the clamping means to the fluid supply for the movable electrode at the T-connection 95 so that hydraulic fluid is supplied to the clamping device at substantially the same time as to the cylinder 92 whereby the clamping means is operative for tightening or clamping according to the operation of the movable electrode. That is, the clamping means operates to tighten or clamp the frame with respect to the conductor 83 as the movable electrode 82 advances into the work engaging position and to unclamp or loosen when the fluid pressure is relieved. As best seen in Fig. 5, the hollow member 118 is provided with a passage 124 having communication at one end thereof with the T-connection 95. The other end of passage 124 is provided with transversely extending passages 125 in order to permit the pressure fluid to pass from the passage 124 into the pressure chamber 120.

In operation the welding gun is first placed in the approximate welding position. Then the fluid for operating the apparatus is supplied through the conduit 94. The most direct path for the fluid leads to the cylinder 92, so that the pressure is first built up below the piston 91, as viewed in Fig. 6, but as the electrode 82 is moved toward the electrode 81 and engages the work to be welded, the pressure is built up successively in the passage 97, conduit 96, passage 124 and finally the chamber 120. The pressure in chamber 120 causes the piston 119 and the lower wall of the casing 121 relatively to move apart thus tending to squeeze the arms 115 and 116 toward each other thereby tightening the engagement between the frame and the mounting member 86 and hence the current carrying conductor 83. Power may then be applied to perform the welding operation in any suitable manner. In order to loosen the connection at the end of the weld, the power is cut off and the fluid pressure supply means is released whereupon the springs 99 and 98 become operative to separate the electrodes 81 and 82 and at the same time the engagement between the arms 115 and 116 and the tongue 114 is loosened thereby permitting the gun 80 to be moved to some other desired position.

Inasmuch as the current to the fixed electrode 81 flows across the connection between the tongue 114 and arms 115 and 116, it is seen that the clamping action serves to provide a connection having a minimum resistance and hence a maximum current transfer with minimum heating.

I arrange the current carrying conductors 83 and 84, the cooling fluid conduits 112, 106 and the fluid supplying conduit 94 into a single cable 126.

In view of the above description, it will be seen that I have provided a welding gun which may be swiveled or pivoted through a large angle without requiring movement of the cable 126 and have provided a hydraulically operated system in which a fluid-operated clamp operates substantially simultaneously with, and dependent upon, the operation of the movable electrode 82. The above described apparatus makes it possible for the operator to conveniently manipulate the welding gun without being required to move the heavy current carrying conductors or the fluid conducting conduits so that it is possible to use adequately dimensioned current carrying conductors without inconveniencing the operator or inducing fatigue. However, by using the method of welding disclosed and claimed in the Patent 2,046,969 of J. H. Redmond, assigned to the same assignee as the present invention, the current carrying conductors can be reduced in size if desired whereby the maneuverability can be increased to some additional extent.

While I have shown a particular embodiment of my invention I do not desire my invention to be limited to the particular construction shown and described and I intend in the appended claims to cover all modifications within the spirit and scope of my invention.

What I claim as new and desire to secure by Letters Patent in the United States is:

1. Welding apparatus comprising a frame, welding electrodes mounted on said frame, means including a pair of current carrying conductors for completing an electric circuit to said electrodes, means for pivotally mounting said frame with respect to said conductors, and fluid pressure operated means cooperating with said mounting means for clamping said frame with respect to one of said conductors in order to prevent relative movement between said frame and one of said conductors.

2. Welding apparatus comprising a frame, welding electrodes mounted on said frame, means associated with one of said electrodes for moving said one electrode with respect to the other of said electrodes, means including a pair of current carrying conductors for completing an electric circuit to said electrodes, mounting means for pivotally supporting said frame on one of said conductors, and means cooperating with said mounting means and dependent upon operation of said moving means for clamping said frame with respect to said one of said conductors in order to prevent relative movement between said frame and one of said conductors, said clamping means being fluid-operated and being so constructed and arranged that said clamping means operates substantially simultaneously with said moving means.

3. Welding apparatus comprising a frame, welding electrodes carried thereby, a fluid pressure operated device for causing said electrodes to engage with work to be welded, an electric circuit including a pair of conductors for supplying welding current to said electrodes, means for conveying fluid to said device, mounting means for said frame and said conductors, the aforementioned parts being so arranged that said frame is pivotally movable with respect to said conductors, fluid pressure operated clamping means for clamping said frame with respect to said conductors, means communicating between said clamping means and said fluid conveying means for conveying fluid to said clamping means and adapted to cause said clamping means to operate at substantially the same time as said device and also responsive to the flow of fluid to said device.

4. Welding apparatus comprising a frame, welding electrodes mounted thereon, means associated with one electrode for moving said one electrode with respect to the other of said electrodes, electric circuit means including a pair of conductors for supplying welding current to said electrodes, terminal means arranged and constructed for connecting one of said conductors to said frame, said terminal means being constructed and arranged to provide pivotal movement between said frame and said one of said conductors, and means cooperating with said terminal means and dependent upon operation of said moving means for tightening the engagement between said terminal means and said frame to prevent such pivotal movement.

5. Welding apparatus comprising a frame, welding electrodes mounted thereon, means associated with one electrode for moving said one electrode with respect to the other of said electrodes, electric circuit means including a pair of conductors for supplying welding current to said electrodes, terminal means arranged and constructed for connecting one of said conductors to said frame, said terminal means being constructed and arranged to provide pivotal movement between said frame and said one of said conductors, and fluid operated means constructed and arranged for operating said moving means for causing said electrodes to engage the work and also for clamping said frame to said terminal means.

6. Welding apparatus comprising a frame, welding electrodes mounted thereon, means associated with one electrode for moving said one electrode with respect to the other of said electrodes, electric circuit means including a pair of conductors for supplying welding current to said electrodes, terminal means for connecting one of said conductors to said frame, said means being constructed and arranged to provide pivotal movement between said frame and said one of said conductors, and clamping means constructed and arranged for clamping said frame to said terminal means in response to the advance of said one of said electrodes into a work engaging position.

7. Welding apparatus comprising a frame, welding electrodes mounted thereon, means associated with one electrode for moving said one electrode with respect to the other of said electrodes, electric circuit means including a pair of conductors for supplying welding current to said electrodes, terminal means for connecting one of said conductors to said frame, said means being constructed and arranged to provide pivotal movement between said frame and said one of said conductors, and means for clamping said frame to said terminal means or for permitting pivotal movement of said frame according to the movement of said one electrode.

8. Welding apparatus comprising a frame, welding electrodes mounted on said frame, an electric circuit including a pair of conductors for supplying welding current to said electrodes, terminal means for attaching one of said conductors to said frame, means providing a pivotal connection between said one of said conductors and said frame, and clamping means for selectively permitting or preventing pivotal movement between said frame and said terminal means, said selective means including a member serving as a pivot and extending through said terminal means and a portion of said frame, a fluid pressure chamber associated with said member, a piston in said chamber and attached to said member, and means for admitting fluid to said chamber for actuating said piston to clamp said frame to said terminal means.

9. Welding apparatus comprising a frame, welding electrodes mounted on said frame, an electric circuit including a pair of conductors for supplying welding current to said electrodes, terminal means for attaching one of said conductors to said frame, means providing a pivotal connection between said one of said conductors and said frame, and clamping means for selectively permitting or preventing pivotal movement between said frame and said terminal means, said selective means including a hollow member serving as a pivot and extending through said terminal means and a portion of said frame, a fluid pressure chamber associated with said member, a piston in said chamber and attached to said member, and means for admitting fluid through said hollow member to said chamber for actuating said piston to clamp said frame to said terminal means.

10. Welding apparatus comprising a frame, welding electrodes mounted on said frame, a cable including a pair of current carrying conductors for completing an electric circuit to said electrodes, means associated with said frame and said cable for providing a pivotal support for said flame, fluid-operated means for clamping said frame for preventing pivotal movement between said frame and said cable, said cable also comprising means for conducting fluid to said clamping means to permit selective clamping or unclamping thereof.

11. Welding apparatus comprising a frame, welding electrodes mounted on said frame, a fluid-operated means associated with one electrode for causing moving thereof with respect to the other electrode, a cable including a pair of conductors for completing an electric circuit to said electrodes, means associated with said cable and said frame for pivotally supporting said frame, said supporting means including a fluid-operated clamp, said cable also comprising means for conducting fluid to said clamp and also to said moving means for moving said one electrode in order to bring said electrodes into the work engaging position and for clamping said pivotal connection.

12. Welding apparatus comprising a frame, welding electrodes mounted thereon, cooling means associated with said frame and said electrodes, a fluid-operated means associated with one of said electrodes for reciprocating said one of said electrodes with respect to the other of said electrodes, a cable including a pair of conductors for completing an electric circuit to said electrodes, means associated with said cable and said frame for pivotally supporting said frame, fluid-operated means for clamping said pivotal support in order to prevent relative movement between said cable and said frame, said cable also comprising means for conducting fluid to said clamping means and said moving means and also means for conducting cooling fluid to said cooling means.

13. In a welder, an electrode for engaging the work; an arm for movably supporting the electrode; a conductor having an end part pivotally connected to the arm; a fluid pressure means for pressing the electrode against the work; a second fluid pressure means having clamping parts for pressing the end part of the conductor against the arm to reduce the contact resistance of the conductor; a source of supply of fluid under pressure; and means for connecting the said fluid pressure means with the said source.

14. Welding apparatus comprising a frame, welding electrodes mounted on said frame, means including a pair of conductors for completing an electric circuit to said electrodes, mounting means pivotally connecting said frame to one of said conductors, said mounting means also being arranged and constructed for clamping said conductor to said frame to reduce the contact resistance therebetween, and fluid pressure means constructed and arranged selectively to cause clamping or unclamping of said frame with respect to said conductor.

15. Welding apparatus comprising a frame, a welding electrode movably carried by said frame, fluid-pressure means for moving said electrode, a conductor, means for pivotally mounting said conductor with respect to said frame, said mounting means also being arranged and constructed for clamping said conductor to said frame, and fluid pressure means for selectively clamping or unclamping said frame with respect to said conductor.

16. Welding apparatus comprising a frame, a welding electrode movably carried by said frame, fluid-pressure means for moving said electrode, a conductor, means for pivotally mounting said conductor with respect to said frame, said mounting means also being arranged and constructed for clamping said conductor to said frame, and fluid pressure means for selectively clamping or unclamping said frame with respect to said conductor, both of said fluid-pressure means being arranged and constructed to operate substantially simultaneously.

17. Welding apparatus comprising a frame, welding electrodes mounted on said frame, means including a pair of conductors for completing an electric circuit to said electrodes, means for pivotally mounting said frame relative to at least one of said conductors, with conductive surfaces on said frame and said one conductor in engagement with each other, means constructed and arranged for cooperation with said mounting means and operable axially of said mounting means for selectively clamping or unclamping said frame with respect to said one conductor thereby permitting or preventing, respectively, relative pivotal movement between said frame and said one of said conductors and, when clamped, urging said surfaces together.

OSCAR C. FREDERICK.